United States Patent [19]

Breuer et al.

[11] Patent Number: 4,961,124
[45] Date of Patent: Oct. 2, 1990

[54] MAGNETIC TAPE CASSETTE HAVING A SLIDING CLOSURE MEMBER THAT LOCKS THE WINDING HUBS

[75] Inventors: Rudolf Breuer, Munich; Hubert Brunner, Weil, both of Fed. Rep. of Germany

[73] Assignee: AGFA-GEVAERT Aktiengesellschaft, Leverkusen, Fed. Rep. of Germany

[21] Appl. No.: 255,613

[22] Filed: Oct. 11, 1988

[30] Foreign Application Priority Data

Oct. 22, 1987 [DE] Fed. Rep. of Germany ....... 3735671

[51] Int. Cl.$^5$ ............................................. G11B 23/02
[52] U.S. Cl. .................................... 360/132; 242/198
[58] Field of Search .......................... 360/132; 242/198; 226/195

[56] References Cited

FOREIGN PATENT DOCUMENTS 0147172 9/1982 Japan .................................. 360/132

*Primary Examiner*—Robert S. Tupper
*Assistant Examiner*—Andrew L. Sniezek
*Attorney, Agent, or Firm*—Connolly & Hutz

[57] ABSTRACT

Figure 3:
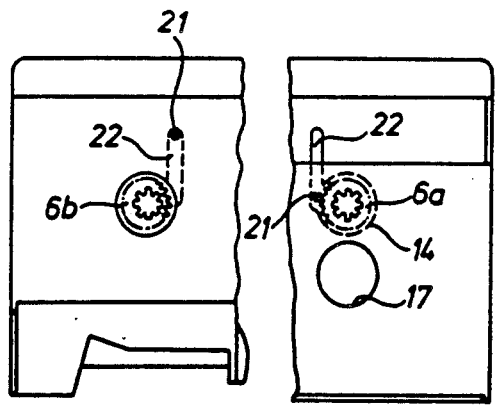

An improved magnetic tape cassette with locking elements for the magnetic tape, through which the opening formed in the front side of the cassette as well as the cut out regions of the winding shaft entry openings are effectively sealed, is characterized in that the slide (15) adjacent to the cassette underside (5) possesses at least two locking catches (21), which move in the grooves (22) of the cassette lower part and which are positioned so that they engage with the toothed rings of the winding hubs (6a,6b) when the slide is in its locked state. Additionally, the slide comprises in the center of its front part a catch, which dips into a groove (25), open forwards as well as downwards, on the outside of the cassette lower part. Through the construction according to the invention, the otherwise customary reel brake together with the prestressing spring becomes superfluous (FIG. 3).

3 Claims, 3 Drawing Sheets

MAGNETIC TAPE CASSETTE HAVING A SLIDING CLOSURE MEMBER THAT LOCKS THE WINDING HUBS

The invention relates to a magnetic tape cassette, in particular a magnetic tape cassette with sealing elements for the magnetic tape, through which the opening formed in the front side of the cassette and the cut-out sections of the reel shaft entry openings formed in the underside of the cassette are effectively closed.

Cassettes of this kind are known, for example, from U.S. Pat. No. 4572461, GB 2155 905, GB 2167 386, EP 0 160 822 and GB 2 165 819. Such a magnetic tape cassette is represented in perspective in FIG. 1. The cassette consists of .an upper casing half (1), which comprises a rear wall (2), side walls (3) running in parallel, and a rectangular cover plate In the middle of the cover plate a window opening (4) is provided, which runs longitudinally.The state of winding of the magnetic tape can be observed through this. A lower casing half (5) contains in the central part of the associated lower base plate two openings (14) in symmetry with each other, into which the drive shafts of the recorder for the reels (6a,6b) are inserted The side walls and rear walls of the upper and lower casing halves are substantially equal in height. If the upper and lower casing halves are mounted one on top of the other, a casing space is formed between them. The reels (6a,6b) that serve to wind and unwind the magnetic tape (7) are arranged in symmetry with each other in the central region of this casing space. Toothing is provided at the upper or lower end regions of the hubs Slide films (8a,8b) are provided on both sides of the reels, so that easy sliding of the magnetic tape is guaranteed. A reel brake (9), prestressed by the spring (18), reaches into the hub toothings The open space formed after mounting between the upper and lower casing halves is sealed by a front flap (11), in order to prevent the penetration of dust into the cassette casing. Undrawn drive elements of a tape drive device dip into the open space. The front flap consists of an oblong front surface with a section bent slightly upwards and side lugs (12) provided at both ends. The front flap is swivel-mounted at the cassette casing by bearing pins (13) projecting from the inner surfaces of the side lugs. A slide (15) is provided for covering the open space of the lower casing half, in order to prevent the penetration of dust through the openings. The slide comprises side walls (16) of equal height running parallel to each other and a rectangular plate for connecting the two side walls. In the central region of the slide two openings (17) are provided in symmetry with each other, through which the recorder-side drive shafts can reach to the reel hubs, if the slide is in the rear position when the magnetic tape cassette is ready to operate. The slide is prestressed by a (not drawn) spring, whose bent-away end is fixed in the post (23) at the lower casing half and whose free end rests against the slide at the projection (19). Another embodiment, which is described in the aforementioned GB 21 55 905, provides, for the prestressing of the slide, a screw spring, whose front part supports itself against a projection in the cassette part and whose rear part supports itself against a projection of the slide and which is guided in a slit provided in the lower half casing.

The foregoing description makes clear the complicated construction of the cassette, which also necessitates expensive assembly. Therefore the object consisted in finding a cassette of the type mentioned in the introduction, which is more easily constructed and assembled.

The object was realised according to the present invention by a magnetic tape cassette with the characteristics displayed in the characterising clause of the claims. Further details emerge from the description and the drawings.

Figure 1:
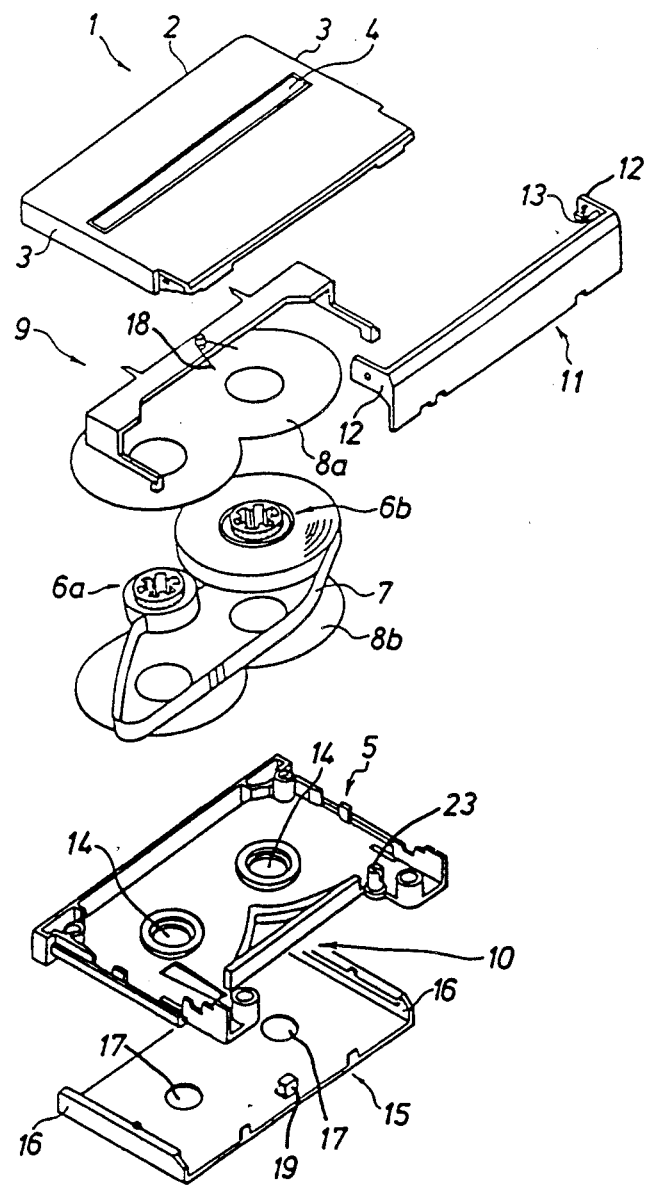
Figure 2:
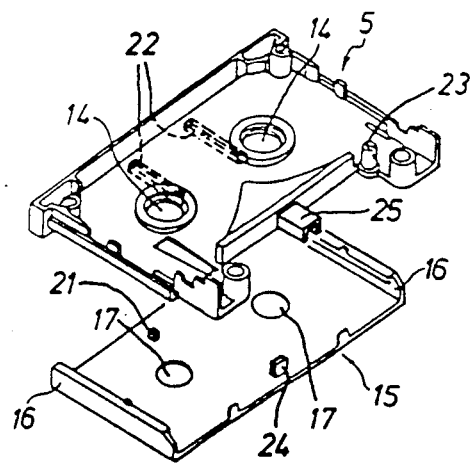
Figure 4:
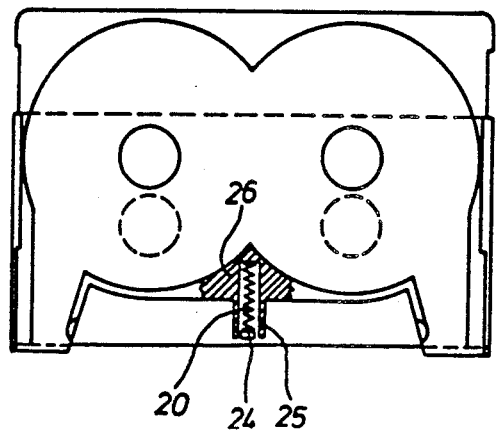
Figure 5:
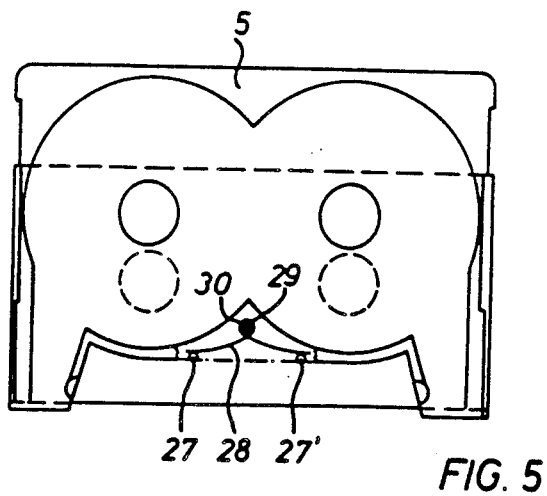

The invention will now be more closely described with reference to the drawings, in which FIG. 1 shows an.. exploded representation of a conventional magnetic tape cassette FIG. 2 shows a representation of the magnetic tape cassette according to the invention, namely of the lower half of the casing and of the slide FIG. 3 shows a top view onto a cassette acording to FIG. 2 with the winding hubs resting in the entry openings, with the state of the cassette, or of the slide, opened and closed FIGS. 4-5 shows schematic top views onto the spring mechanism of the slide FIGS. 2 and 3 show the construction of the magnetic tape cassette according to the invention, specifically the alterations to the cassette lower part (5) and to the slide (15). From the baseplate of the slide (15) two locking catches 21 project from the top of the back part facing the underside of the cassette (5). The guide grooves 22 run parallel therein to the side walls (16) of the slide They begin at the entry openings (14) and run up to the rear part of the cassette underside, wherein their length corresponds to the full region of displacement of the slide. The function of the locking catches 21 emerges from illustration 3: in the right-hand part the locked state of the cassette when out of operation is represented There, the slide 15 is located in its forward position, and the locking catches reach into the toothed rings of the winding hubs (6a,6b) With the cassete in operation in the recorder the slide 15 is located in its back position (FIG. 3, left-hand side) wherein the openings (14,17) of the bottom part of the cassette or of the slide 15 lie one on top of the other and enable the entry of the recorder-side drive shafts In this state the locking catches release the toothed rings. The length, the shape and the position of the locking catches 21 and grooves 22 are calculated so that a secure and optimal barring or releasing of the winding hubs occurs depending on the arrangement of the guide grooves 22 in relation to the position of the entry openings (14).

The prestressing of the slide (15) emerges from FIGS. 2 and 4. The slide (15) has in the center of its front upper side a catch (24) which reaches into a groove (25) open both downwards and forwards on the underside of the lower part of the cassette. A coil spring (20) rests in this groove, which supports itself with its front end against the catch, and with its rear end against the end of the groove in the wall (26) of the lower part 5 of the cassette.

Another solution, with which the prestressing of the slide is effected, emerges from FIG. 5. A two-limbed spring (28) rests with its central convoluted part (29) against a post (30), which is injected against the exterior of the cassette underside, while the two limbs support themselves against projections (27,27'), which are injected at both sides of the middle of the front part of the slide.

The reel brake (9) together with its spring (18) becomes superfluous with the magnetic tape cassette according to the invention (FIG. 1), additionally the post

(23) falls away due to the simpler device for prestressing the slide, so that construction of the cassette as well as its assembly are markedly simplified. The improvements according to the invention become particularly effective in connection with the coupling of the activation of the front flap (11) with the slide (15) based on the German application, reference number P 36 43 457, of the applicant.

We claim:

1. A magnetic tape cassette for magnetic tape on tape hubs comprising:

a casing consisting of an upper casing half and a lower casing half containing a pair of winding hubs rotatable therebetween and a slide situated outside of the casing and a magnetic tape wound upon said hubs and having entry openings provided both in said lower casing half and said slide, toothed rings on an exterior surface of each of said hubs, side walls on said slide and guides in the lower casing half so constructed and arranged that the slide is movable in a forward and backward motion with relation to the lower casing half, a spring engaged between said lower casing half and said slide for urging the lower casing half and slide into a closed position of said casing in which the respective entry openings in the casing lower half and slide are nonaligned whereby the slide is movable against the tension of said spring to an open position of said casing in which the respective entry openings are aligned.

a baseplate of said slide arranged adjacent to the lower casing half, said entry openings in said slide being formed in said baseplate.

at least one projecting locking catch on the surface of the baseplate extended toward the lower casing half engaged in a guide groove formed in said lower casing half and said locking catch engageable with the toothed ring of a hub when said slide is in the closed position.

2. In a magnetic tape cassette as claimed in claim 1, a groove formed on said lower casing half facing the slide and containing said spring within a wall of the lower casing half, the groove and a projecting catch on said baseplate extending into said groove and engaging said spring to urge said baseplate into the closed position of said casing.

3. In a magnetic tape cassette as claimed in claim 1, a post mounted on said lower casing half facing the slide, the spring being mounted on said post with a pair of spring members positioned under compression against a pair of projections formed on said baseplate and extending toward the lower casing half to urge said baseplate to the closed position of said casing.

* * * * *